(No Model.) 2 Sheets—Sheet 1.

G. W. & E. B. WILSEY.
POWER CONVERTER.

No. 407,385. Patented July 23, 1889.

Witnesses
M. Fowler
N. L. Collamer

Inventors
George W. Wilsey and
Eben B. Wilsey
By their Attorneys (No Model.) 2 Sheets—Sheet 2.

G. W. & E. B. WILSEY.
POWER CONVERTER.

No. 407,385. Patented July 23, 1889.

Witnesses
M. Fowler
N. L. Collamer

Inventors
George W. Wilsey and
Eben B. Wilsey
By their Attorneys

UNITED STATES PATENT OFFICE.

GEORGE W. WILSEY AND EBEN. B. WILSEY, OF AURORA, ILLINOIS.

POWER-CONVERTER.

SPECIFICATION forming part of Letters Patent No. 407,385, dated July 23, 1889.

Application filed April 19, 1889. Serial No. 307,763. (No model.)

*To all whom it may concern:*

Be it known that we, GEORGE W. WILSEY and EBEN. B. WILSEY, citizens of the United States, residing at Aurora, in the county of Kane and State of Illinois, have invented a new and useful Power-Converter, of which the following is a specification.

This invention relates to power-converters of that class generally employed in converting the vertical reciprocating motion of a windmill pump-rod into rotary motion for any desired purpose; but we desire it understood that the device is capable of being elsewhere applied to equal advantage.

The invention consists of details of construction which will appear from the following description and the accompanying drawings.

Figure 1:
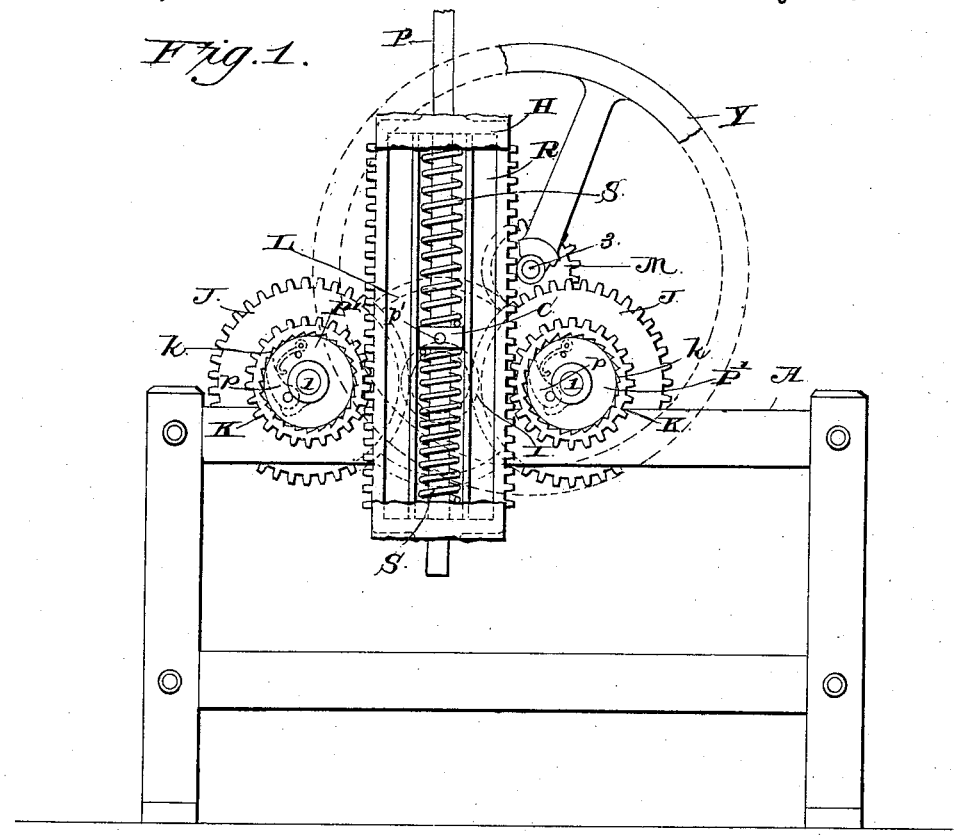
Figure 2:
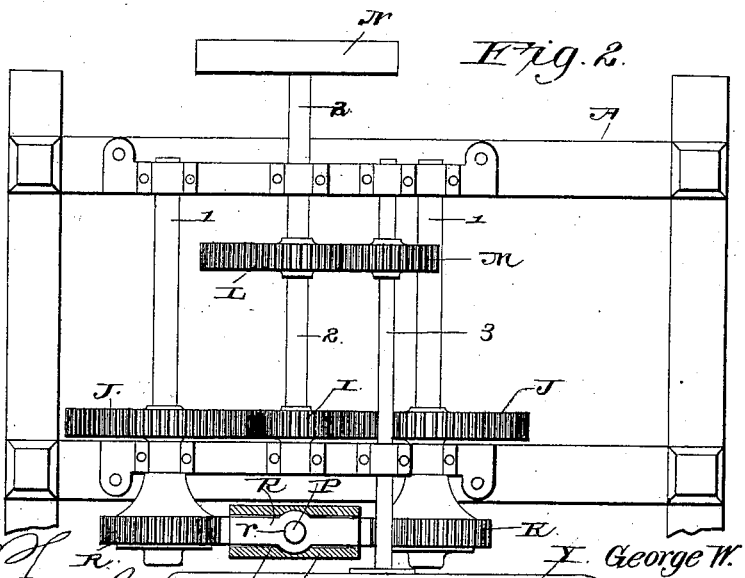
Figure 3:
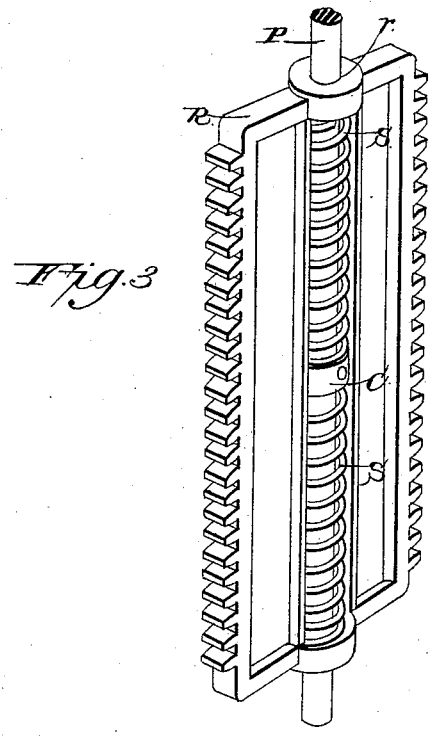
Figure 4:
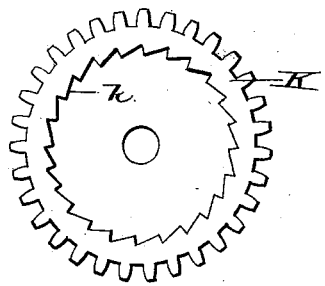
Figure 5:
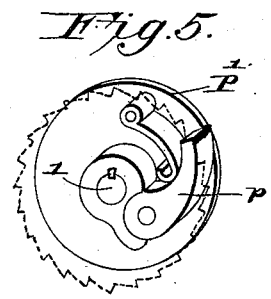
Figure 6:
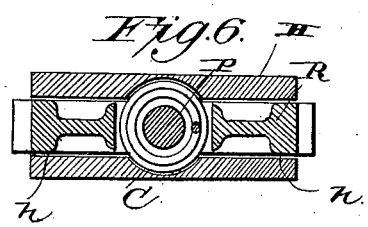

In the said drawings, Figure 1 is a side elevation of our machine with the side of the housing removed. Fig. 2 is a plan view. Fig. 3 is an enlarged detail in perspective of the rack and its frame and connections partly broken away. Fig. 4 is a detail of one of the cog ratchet-wheels enlarged. Fig. 5 is a detail of the plate, pawl, and spring within said cog ratchet-wheel. Fig. 6 is a horizontal section of the rack and housing.

The same letters of reference are applied to similar parts throughout.

The letter A designates a suitable framework, upon which our machine is supported, and in which its several shafts have their bearings, all as will be well understood without future reference thereto.

P is the pump-rod, to which the windmill imparts a vertically-reciprocatory motion.

H is a housing of wood through which the pump-rod passes, and in a slot $h$ therein is guided the double rack R. The latter is provided with holes $r$ at top and bottom, through which the pump-rod may slide freely when it is not desired to run the machine.

C is a collar loose on the pump-rod and having a lateral hole in which a bolt or pin $p'$ may be inserted to lock it thereon, when desired. The collar C is located inside the rack R, and strong springs S coiled on the pump-rod above and below the collar serve to unite the rack and collar, yet to permit a certain yielding between them, which is especially desirable in use where rotatory machinery is to be connected to pump-rods, because the latter are by no means steady and even in their movements.

K is a wheel loosely journaled on shaft 1, and having peripheral teeth engaging those on the rack R. The wheel K is cut out on one face and provided with an internal ratchet $k$. Within the cut-away portion is mounted a plate or disk P', keyed to the shaft 1 and carrying a spring-actuated pawl $p$ engaging the teeth of said ratchet $k$. There are two of these wheels K, as seen in Fig. 1, one on either side of the rack R. As said rack descends, that on the right will turn its shaft 1, while that on the left, being turned in the opposite direction, will slip over the ratchet without effect. Upon the ascent of the rack the result will be reversed.

The twin shafts 1 are extended across the machine and provided at suitable points with gears J. A shaft 2 is provided carrying an idle cog I, which connects the gears J, and hence causes the shafts 1 and disks P keyed thereon to move in unison. The power transmitted by the rack R through the ratchet-wheels K alternately, and thence through shafts 1 and gears J and I, thus serves to maintain a steady rotation of the shaft 2, and by gears L M this motion is communicated to shaft 3 carrying a fly or balance wheel Y.

A pulley N is preferably mounted on the shaft 2, as shown, from which the power may be transmitted to machinery as desired. We do not confine ourselves strictly to the use of the shaft 3, as the balance-wheel may be mounted directly on the main shaft 2, or may in some cases be omitted; but by making the gear L large and M small a considerable speed will be given the shaft 3, and the heavy balance-wheel thereon will serve to maintain the steady rotation of the several shafts and a uniform speed of the entire machine. It will be understood that at each end of the stroke of the pump-rod P one of the springs S serves as a cushion, and the lower one is shown somewhat compressed in Fig. 1, as it would be at the moment the rod P begins its down stroke. If the balance-wheel Y were not employed a sudden clucking of the machine would occur at this time, especially if the machinery being operated were heavy or offered considerable resistance, whereas the balance-wheel overcomes this tendency and causes a compression of the springs S, resulting in the steady and even running of the machine.

Having described our invention, we claim—

1. In a power-converter, the housing H, rod P, collar C thereon, double rack R, guided in a slot $h$ in said housing, and springs S coiled on said rod above and below said collar and within said rack, in combination with the twin shafts 1 and ratchet-gears K, mounted thereon and engaging said rack, substantially as described.

2. The rod P and the double rack R carried thereby, in combination with the twin shafts 1, and twin wheels mounted thereon, each wheel comprising a gear K, loosely mounted on the shaft and engaging said rack, a disk P′, keyed to said shaft within said gear, a spring-actuated pawl $p$, carried by said disk and engaging an internal ratchet $k$ in said gear, and with a main shaft 2 and gears J J and I connecting said twin shafts to said main shaft, substantially as described.

3. The double rack R, the rod P, and collar C fitting loosely thereon, and the spring S, coiled upon said rod within said rack above and below said collar, in combination with a pin $p'$, for securing the collar upon the rod and disconnecting it therefrom at will, substantially as described.

4. The rod P, the rack R, mounted loosely thereon, and the collar C upon said rod within said rack, in combination with cushion-springs within said rack above and below said collar, as and for the purpose set forth.

In testimony that we claim the foregoing as our own we have hereto affixed our signatures in presence of two witnesses.

GEORGE W. WILSEY.
EBEN. B. WILSEY.

Witnesses to signature of George W. Wilsey:
S. P. RADY,
MAY WILSEY.

Witnesses to signature of Eben. B. Wilsey:
I. W. WILSEY,
C. E. WEAVER.